Figure 1:
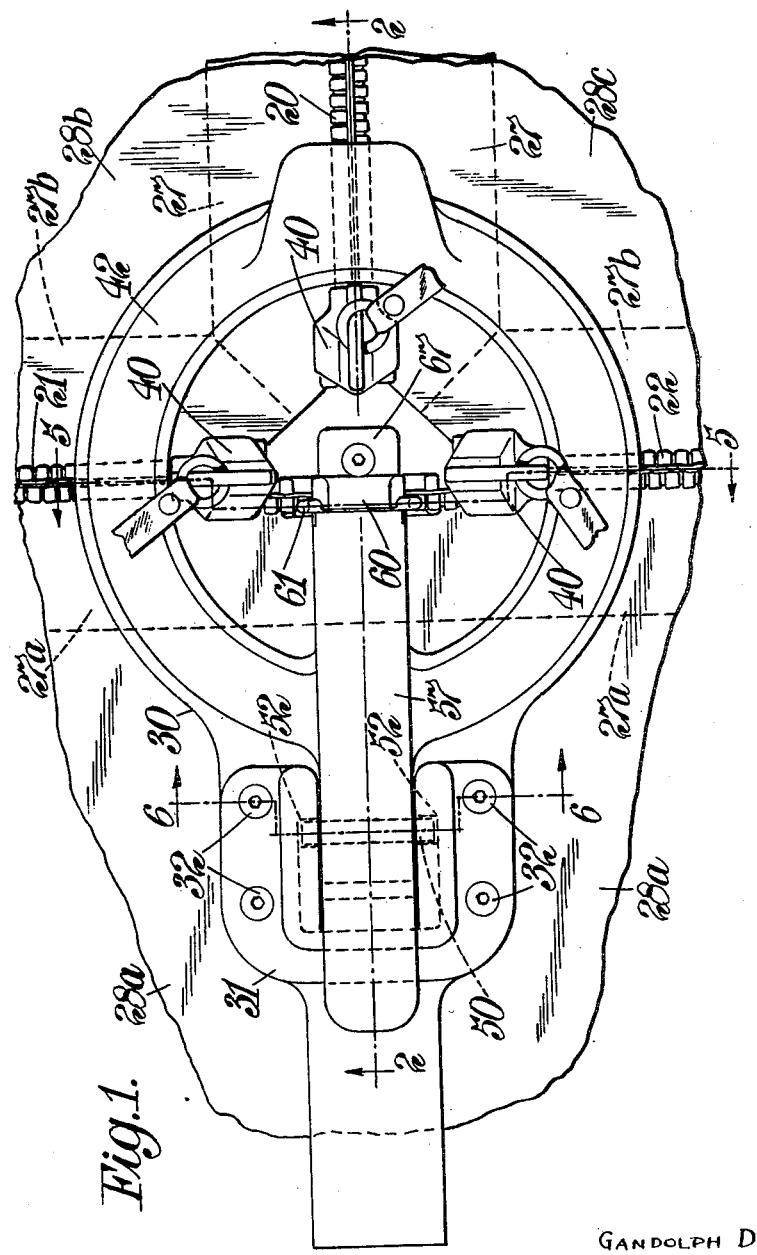

GANDOLPH DOELTER,
Inventor,
By Hall & Houghton
Attorney.

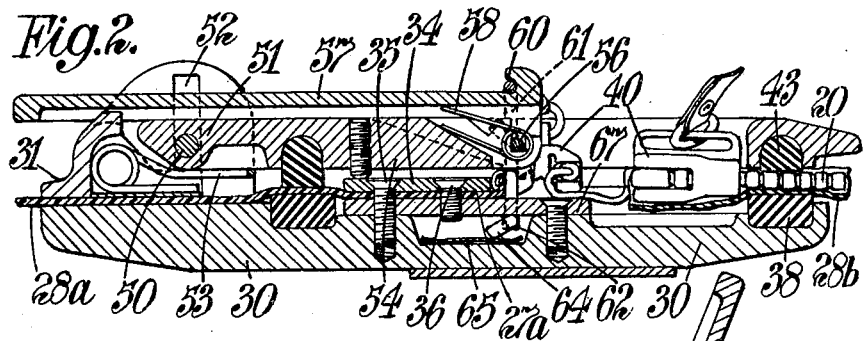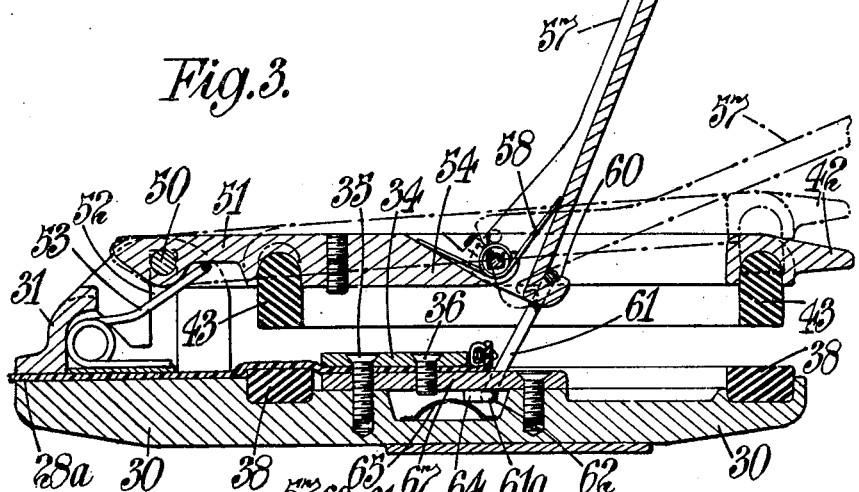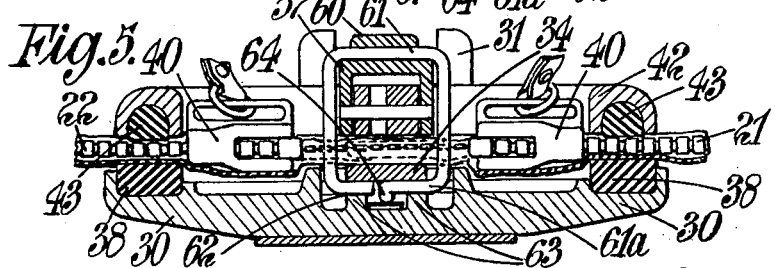

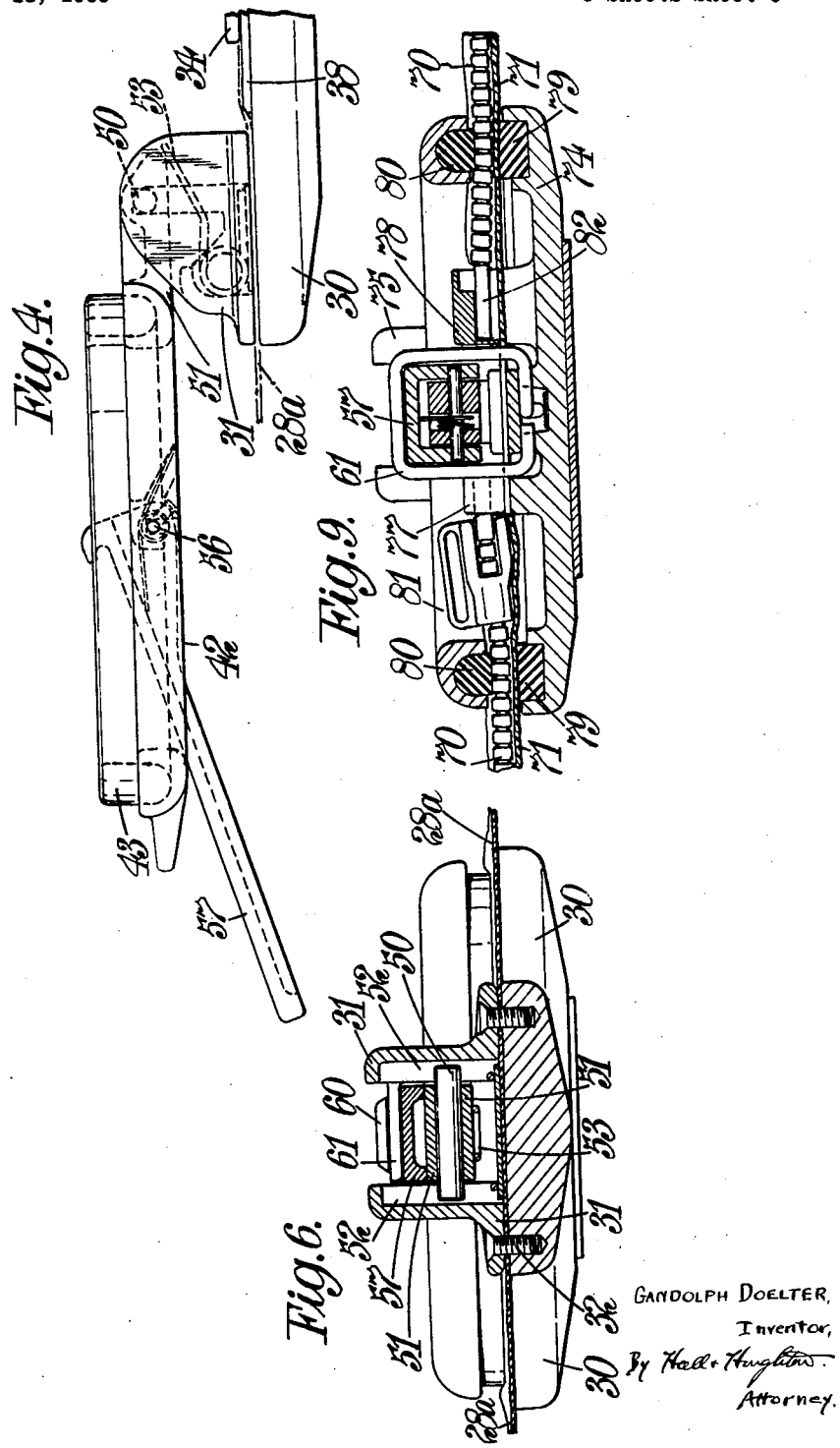

April 24, 1962 G. DOELTER 3,030,683
SEALING MEANS FOR SLIDING CLASP CONTINUOUS FASTENERS
Filed May 18, 1959 5 Sheets-Sheet 4
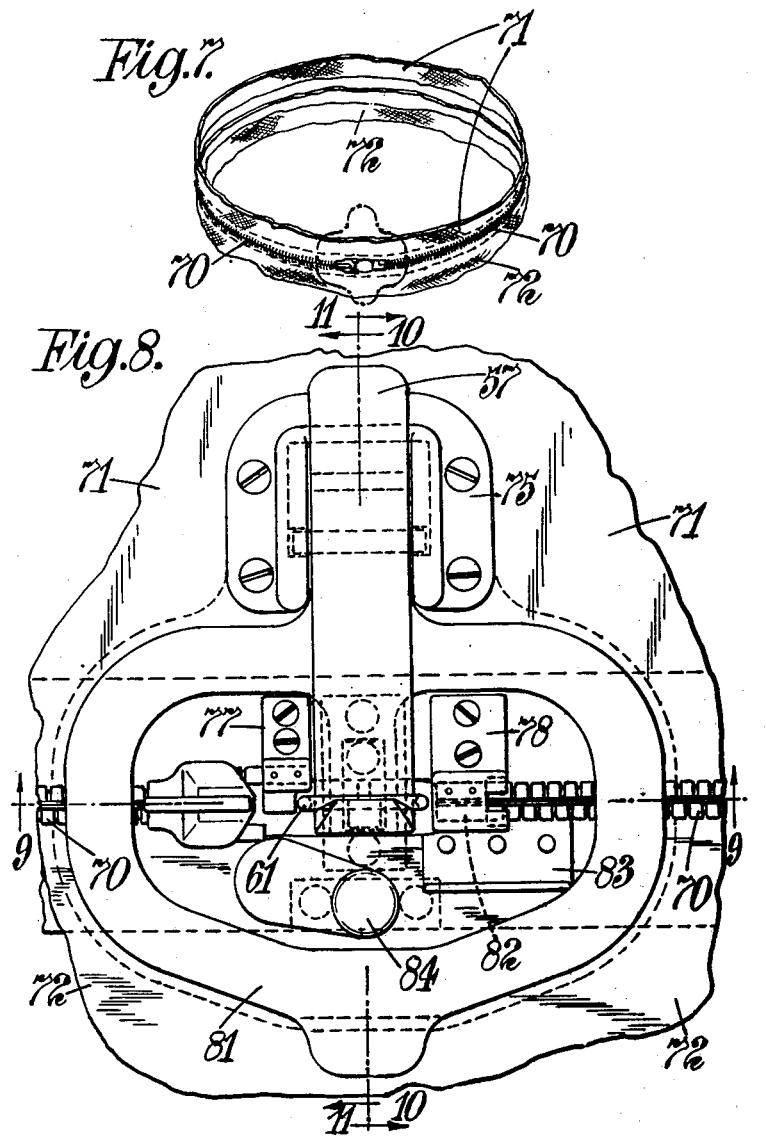
Gandolph Doelter,
Inventor,
By Hall & Houghton,
Attorney.

April 24, 1962  G. DOELTER  3,030,683
SEALING MEANS FOR SLIDING CLASP CONTINUOUS FASTENERS
Filed May 18, 1959  5 Sheets-Sheet 5
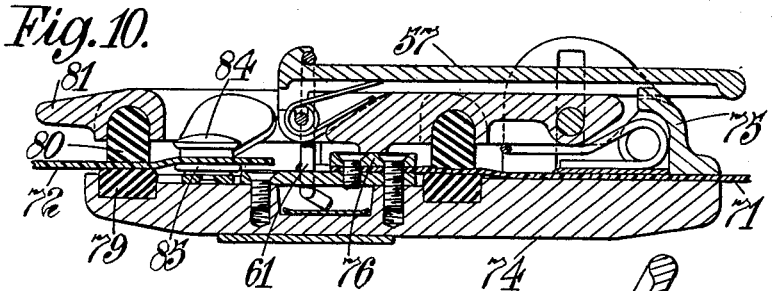
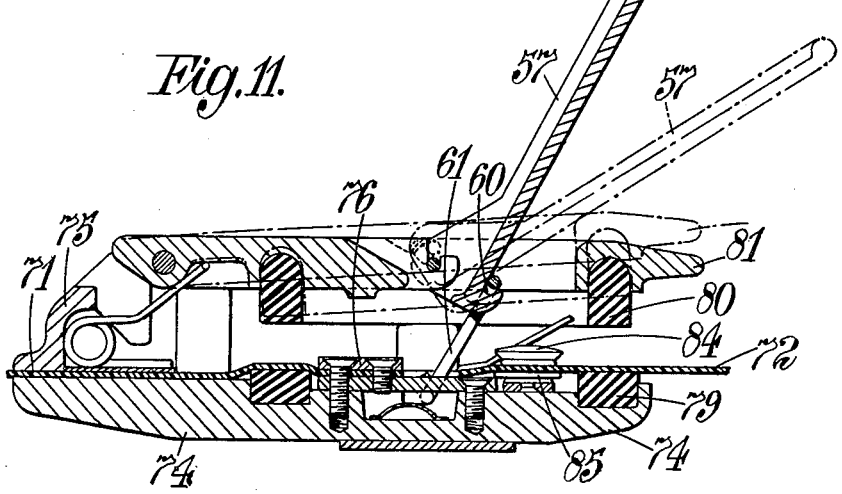
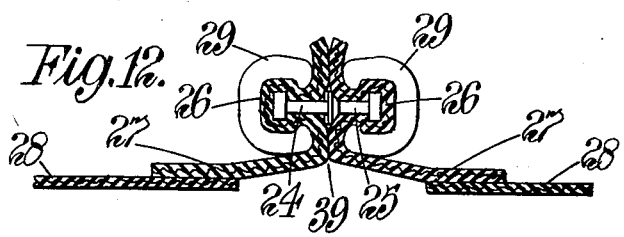
GANDOLPH DOELTER,
Inventor,
By Hall & Houghton,
Attorney.

United States Patent Office 3,030,683
Patented Apr. 24, 1962

3,030,683
SEALING MEANS FOR SLIDING CLASP CONTINUOUS FASTENERS
Gandolph Doelter, 96 Beaufort Mansions, London, England
Filed May 18, 1959, Ser. No. 813,899
Claims priority, application Great Britain Feb. 26, 1959
9 Claims. (Cl. 24—205.1)

The invention relates to sliding clasp continuous fasteners of the kind comprised of two parts each comprising a row of fastener elements secured to a strip or sheet of flexible material and a slide which is movable along the rows from one end to the other and is operative on movement in one direction (herein called the closing direction) to bring the elements of the two rows into interlocking engagement and so to close the fastener and on movement in the other direction (herein called the opening direction) to separate the elements of the two rows. Fasteners of this kind are known which provide a substantially fluid tight closure along the fastener when the two parts are closed together. Examples of such fluid tight fasteners are disclosed in British patent specifications Nos. 723,998, 769,535, 769,536 and 769,537. Fluid tight fasteners of this nature are of considerable practical value in that they enable a large opening in a flexible article to be readily opened and closed in a fluid tight manner but the sealing of the end of the fastener (herein called the closing end) to which the clasp is moved on movement in the closing direction has presented a problem. This problem has been solved in the case of a fastener in which the two strips or sheets at that end are permanently secured together or constructed integrally, a solution of the problem being disclosed in application No. 755,755, filed on August 18, 1958, now Patent No. 3,005,247.

However it is often advantageous to employ a fastener (hereinafter called an open ended fastener) having the two flexible strips or sheets separable at the closing end when the clasp has been moved in the opening direction away from that end to open the fastener. Moreover a a fastener (hereinafter called a separable fastener) of which the two parts are separable at both ends of the fastener when the elements are disengaged has the advantage that the two parts may be entirely separated. Such an arrangement is particularly advantageous, for example, when the fastener is used to secure two parts of a pressurised suit but in such a case there may arise the problem of sealing the fastener at each end. In practice the ends of such open-ended or separable fasteners only require to be sealed when there are two or more fastener ends adjacent one another and the fasteners serve, when closed, to join flexible sheet material as a continuous surface around the ends. For example the adjacent ends of two or more fasteners extending along meeting aligned or converging joints or the two ends of a separable fastener extending around a continuous ring joint and any portion of the joint or joints left between the fastener ends may require to be sealed. The present invention is concerned with the problem of effecting a seal for such ends and any opening remaining in a joint between them.

The invention provides means for sealing two or more adjacent ends of fluid tight sliding clasp continuous fasteners of the kind described arranged, when closed, to join flexible sheet material as a continuous surface around an area containing the ends, which sealing means comprise an impervious clamping member arranged to lie against one face of the continuous surface around the said area and to cover the area, a second clamping member arranged to lie against the other face of the continuous surface around the area and in opposed relation to the first clamping member and means for drawing the two clamping members together to clamp the continuous surface between them and in fluid tight engagement with the first member around the area.

When the sealing means as just defined are applied to the form of fastener of the kind described in which, when closed, there is formed in one face of the continuous surface a groove along the joint and along the other face there is a ridge constituted by the elements, the first-mentioned clamping member is adapted to extend into the grooves and making sealing engagement therewith. The clamping member may, for example, be constructed of, or faced with (e.g. as a ring) rubber or like resilient material which is deformable under the clamping pressure to fit into the grooves. Alternatively, or in addition, the member may be preformed to fit into the grooves.

The second clamping member preferably has a ring of resilient material which is preformed or deformable under the clamping pressure, to fit over the ridges of the closed fastener and to engage with the continuous surface at each side of the ridges and extending therebetween.

There will now be described, by way of example, two specific constructions of sealing means which embody the above and other features of the invention, the description referring to the accompanying drawings in which:

FIGURE 1 is a plan view showing sealing means for the closing ends of three fasteners,
FIGURE 2 is a section on the line 2—2 in FIGURE 1,
FIGURE 3 is a section similar to FIGURE 2 but showing the sealing means released,
FIGURE 4 is a part elevation corresponding to FIGURE 3 but showing the sealing means fully opened,
FIGURE 5 is a section on the line 5—5 in FIGURE 1,
FIGURE 6 is a section on the line 6—6 in FIGURE 1,
FIGURE 7 is a diagrammatic view showing a separable fastener,
FIGURE 8 is a plan view of sealing means for the two ends of the fastener shown in FIGURE 7,
FIGURE 9 is a section on the line 9—9 in FIGURE 8,
FIGURE 10 is a section in the direction 10—10 in FIGURE 8 showing the sealing means in engaged position,
FIGURE 11 is a section in the direction 11—11 in FIGURE 8 but showing the sealing means released, and
FIGURE 12 is a section through one of the fasteners employed.

The sealing means shown in FIGURES 1 to 6 is intended to seal the gap at the ends of three converging open-ended sliding clasp fasteners 20, 21, 22. Each fastener is of the kind described in the above-mentioned specifications and comprises, as shown more particularly in FIGURE 12, two parts each having a row of headed inner elements 24, 25 held within a fold 26 in a flexible impervious tape 27, by means of outer elements 29. The tapes are, in turn, secured to impervious sheets 28 which are to be joined in pressure tight manner. The sheets may, for example, constitute the walls of a flexible airtight bag or container for an aircraft engine or other piece of equipment, the fastener enabling a large access opening to the container to be closed in air-tight manner. Fasteners of this construction are, when closed, fluid-tight by reason of the pressure engagement of the faces of the tapes between the outer elements 29. There remains however a gap at the open end of such a fastener which receives the separating element of the sliding clasp and there may also be a gap left beyond the end of the fastener. The means of the present example are directed to the sealing of these gaps in the three converging fasteners shown in FIGURES 1-6. In this particular example the tapes 27a and the row of elements attached thereto at the left-hand side of the joints 21, 22 (as seen in FIGURE 1) are continuous, in line, and attached along the edge of a common sheet 28a. They may however be discontinuous and out of alignment. The tapes 27b and element rows at the right-hand side of the joints are discontinuous and attached to separate sheets 28b, 28c which are, in turn, separable along the joint 20.

The sealing means comprise a plate 30 which is clamped to the sheet 28a by means of a bracket 31 and screws 32. The plate is also clamped to the tape 27a by means of a clamping plate 34 and screws 35, 36. Around the plate there is a ring 38 of rubber or like material which is sufficiently deformable to enter, under the clamping pressure applied as later described, into the grooves 39 (FIGURE 12) formed between the tapes 27 at the joints. The diameter of the ring is such that it lies outside the area containing the clasps 40 and the gaps in the joints, when the joints are closed.

Hinged to the bracket 31 there is a clamping ring 42 which carries in a groove a soft rubber ring 43 which overlies the ring 38. When clamping pressure is applied to the ring 43, as later described, it deforms to receive the ridges constituted by the joints 20, 21, 22 and to press the joints as well as the continuous surface provided by the tapes 27 and sheets 28a, 28b and 28c into sealing engagement with the ring 38. Accordingly the ring 38 by its engagement with one face of the continuous surface and in co-operation with the plate 30 serves to seal any openings there may be between the joints within the compass of the ring.

The means for producing the clamping pressure between the ring 43 and the ring 38 for effecting the seal will now be described. As already stated, the ring 43 is carried by a ring 42 which is hinged to the bracket 31. The hinge consists of a pin 50 fixed to a lug 51 on the ring 42 and received for pivotal and sliding movement in upright slots 52 in the bracket 31. The ring 43 is accordingly free for up and down movement between the positions shown in FIGURES 3 and 5 and pivotal movement between the positions shown in FIGURES 3 and 4. A spring 53 urges the ring upwardly to the position of FIGURE 3. Extending into the ring 43 there is an arm or spoke 54 to which there is pivoted, at 56, a lever 57. A spring 58 urges the lever in the clockwise direction as viewed in FIGURE 3. The lever has a hook 60 which is engageable in a loop 61 pivoted to the plate 30. Anti-clockwise movement of the lever from the position of FIGURE 3 to that of FIGURE 2, with the hook engaged in the loop, effects downward movement of the rings 42 and 43 into pressure engagement with the fasteners and sheets, the lever being held in the position of FIGURE 2 by an overcentre toggle action of the loop.

The bottom cross-piece 61a of the loop 61 is received in slots 26 in rails 63 formed in the plate 30 and at the centre of the cross-piece the loop has a projection 64 which is urged upwardly (FIGURE 2) by a leaf spring 65. Accordingly the loop tends to assume the position shown in which it is presented for engagement by the hook 60. The loop is held to the plate 30 by a plate 67.

In the operation of the device to close the container the three sliding clasps 40 are drawn along the fasteners 20, 21, 22 in the closing direction until they lie, as shown in FIGURE 1, within the compass of the ring 38, and over the plate 30, the rings 42, 43 then being in the open position shown in FIGURE 4. As a result of this operation the sheets 28a, 28b and 28c are joined together in fluid-tight relation to form a continuous surface which has openings only within the ring 38. The ring 42 is next moved to the position shown in chain lines in FIGURE 3 which enables the hook 60 to be engaged within the loop 61 and beneath the top cross-piece thereof. Finally the lever 57 is swung to the position shown in FIGURE 2 which draws the rings 38 and 43 together to clamp the sheets 28a, 28b and 28c and the fasteners 20, 21, 22 in fluid-tight engagement with the ring 38 whereby the ring, in co-operation with the plate 30, serves to seal off the openings within the ring 38.

In the construction shown in FIGURES 1–6 and as described above, there are three converging fasteners of which two are in alignment. There may however be two fasteners or more than three. The particular construction shown will accommodate up to five. Moreover it is not essential that any of the fasteners be in alignment.

The specific construction shown in FIGURES 7 to 11 will now be described. This construction relates to a single separable fastener 70 which is shown diagrammatically in FIGURE 7. In this diagram the fastener is shown as being used for effecting a fluid-tight ring joint between two pieces of sheet material 71, 72 which are portions of two separable parts of a pressurized suit. There is necessarily a gap left between the two ends of the fastener, when closed, and the means of the present example are directed to the sealing of this gap.

There is a plate 74 which is permanently clamped to the sheet material 72 by a bracket 75 and a clamping plate 76 in a manner which is analogous to the first example. Additional clamping is obtained by stop plates 77, 78 later described. The plate 74 carries a resilient ring 79 which is equivalent to the ring 38 above. Hinged to the bracket 75 on the plate 74 there is a rigid ring 81 which is analogous to the ring 42 and carries a resilient ring 80 equivalent to the ring 43. A loop 61 and a lever 57 with a hook 60 are provided for bringing the two rings 79 and 80 into pressure engagement with the sheet material 71, 72 as in the first example.

The stop plate 77 provides an anchor for one end of the row of fastener elements which is fixed to the piece of sheet material 71 and also serves as a stop for the sliding clasp 40 at the end of its movement in the closing direction. The stop plate 78 serves as an anchor for the other end of the row of elements, as a stop for the clasp at the end of the opening movement and as a socket for a locating pin or spigot 82 at the end of the other row of elements. There is also a guide member 83 for leading the pin into the socket.

As already explained, the sheet part 72 is completely separable from the part 71 and the sealing means carried by plate 74, when the fastener is opened. In order that the parts 71 and 72 may be joined it is necessary that the ends of the fastener first be in the correct relative positions and to assist in this there is provided a press-stud 84. The male part 85 of the press-stud is secured to the plate 74 and the cap part to the sheet 74. The press-stud is engaged as a first operation in the joining and sealing of the two parts of the suit.

In the above example the lower rings 38 and 79, are, as already stated, sufficiently resilient to be deformed into the grooves 39. They may however be pre-formed with ribs to fit into the grooves and if desired they may then be of less or non-resilient material. The rings 43 and 80 are, in the examples, sufficiently deformable to receive, by deformation, the ridges constituted by the elements but they also may, if desired, be preformed to receive the ridges.

I claim:

1. The combination with at least two fluid-tight sliding clasp continuous fasteners each of the kind comprising two parts each having a row of headed inner fastener elements held within a fold in a piece of flexible impervious sheet material by means of U shaped outer clamping elements embracing the fold and a sliding clasp which is slidable along the two rows to a closing end thereof to bring the headed inner elements into interfitting holding engagement, with the arms of the clamping elements of the two parts in opposed relation and with the two pieces of sheet material clamped together in fluid tight relation along the joint between the opposed arms of the clamping elements, said clasp having a separating stripper member which remains between the two rows of fastener elements at the closing end of the fastener when the fastener is closed and leaves an opening between the rows at the closing end, said fasteners being arranged, when closed, to join the flexible material as a continuous surface around an area containing the closing ends thereof, of means for sealing the openings at the closing ends which comprise an impervious clamping member arranged to lie against one face of the continuous surface continuously around said area and to cover the area, a second clamping member arranged to lie against the other face of the continuous surface around the area and in opposed relation to the first clamping member, the two members being arranged to encompass the sliding clasps, and means for drawing the two clamping members together to clamp the continuous surface between them and in fluid-tight engagement with the first member around the area.

2. The combination as claimed in claim 1 in which each fastener, when closed, forms in one face of the continuous surface a groove along the joint and along the other face a ridge constituted by the elements and wherein the first-mentioned clamping member is adapted to extend into the grooves and to make sealing engagement therewith.

3. The combination as claimed in claim 2 in which the said clamping member has a clamping face of resilient material which is deformable under the clamping pressure to fit into the grooves.

4. The combination as claimed in claim 2 in which the said clamping member is pre-formed to fit into the grooves.

5. The combination as claimed in claim 2 in which the second clamping member is deformable, under the clamping pressure, to fit over the ridges of the closed fasteners and to engage with the continuous surface at each side of the ridges and extending therebetween.

6. The combination as claimed in claim 2 in which the second clamping member is pre-formed to receive the ridges.

7. The combination as claimed in claim 1 in which the second clamping member is in the form of a ring.

8. The combination as claimed in claim 1 in which the means for drawing the two clamping members together comprise a lever-operated disconnectible toggle-link connection between the two members.

9. The combination with a fluid-tight sliding clasp continuous fastener of the kind comprising two separable parts each having a row of headed inner fastener elements held within a fold in a piece of flexible impervious sheet material by means of U-shaped outer clamping elements embracing the fold and a sliding clasp which is slidable along the two rows from an opening end to a closing end thereof to bring the headed inner elements into interfitting holding engagement, with the arms of the clamping elements of the two parts in opposed relation and with the two pieces of sheet material clamped together in fluid tight relation along the joint between the opposed arms of the clamping elements, said clasp having a separating stripper member which remains between the two rows of fastener elements at the closing end when the fastener is closed and leaves an opening between the rows at the closing end, said fastener joining the two pieces of sheet material as a substantially continuous ring with the ends of the fastener adjacent one another, of means for sealing the ends of the fastener which comprise an impervious clamping member arranged to lie against one face of the two pieces of the sheet material continuously around an area containing the two ends of the fastener and to cover said area, a second clamping member arranged to lie against the other face of the sheet material around said area and in opposed relation to the first said clamping member, the two members being arranged to encompass the sliding clasp and means for drawing the two clamping members together to clamp the sheet material between them and in fluid tight engagement with the first member around the area.

References Cited in the file of this patent

UNITED STATES PATENTS

| 2,385,816 | Krupp | Oct. 2, 1945 |
| 2,746,114 | Williams | May 22, 1956 |

FOREIGN PATENTS

| 552,349 | Canada | Jan. 28, 1958 |
| 1,052,748 | France | Jan. 26, 1954 |
| 1,186,311 | France | Feb. 23, 1959 |